Patented Feb. 5, 1924.

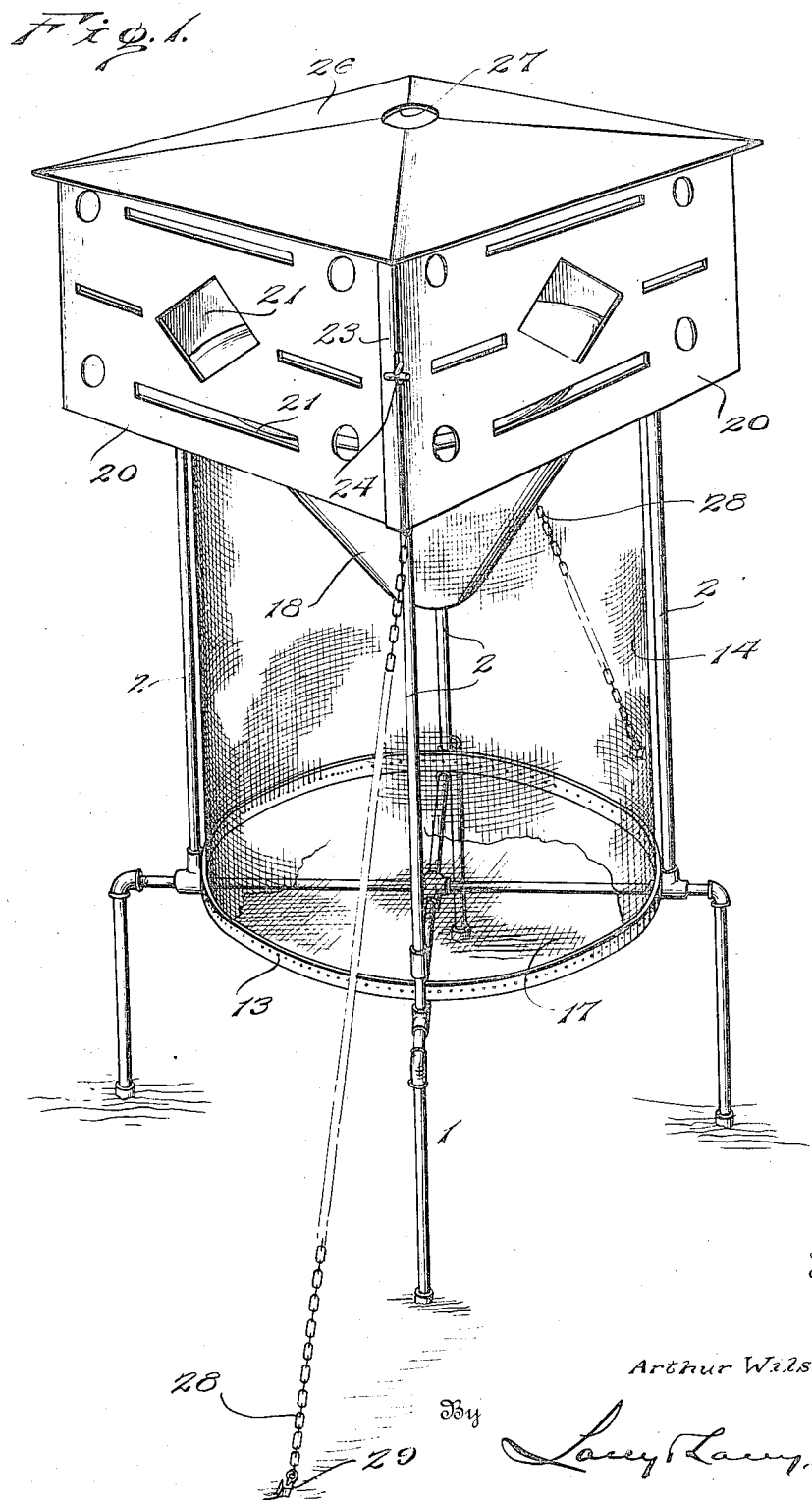

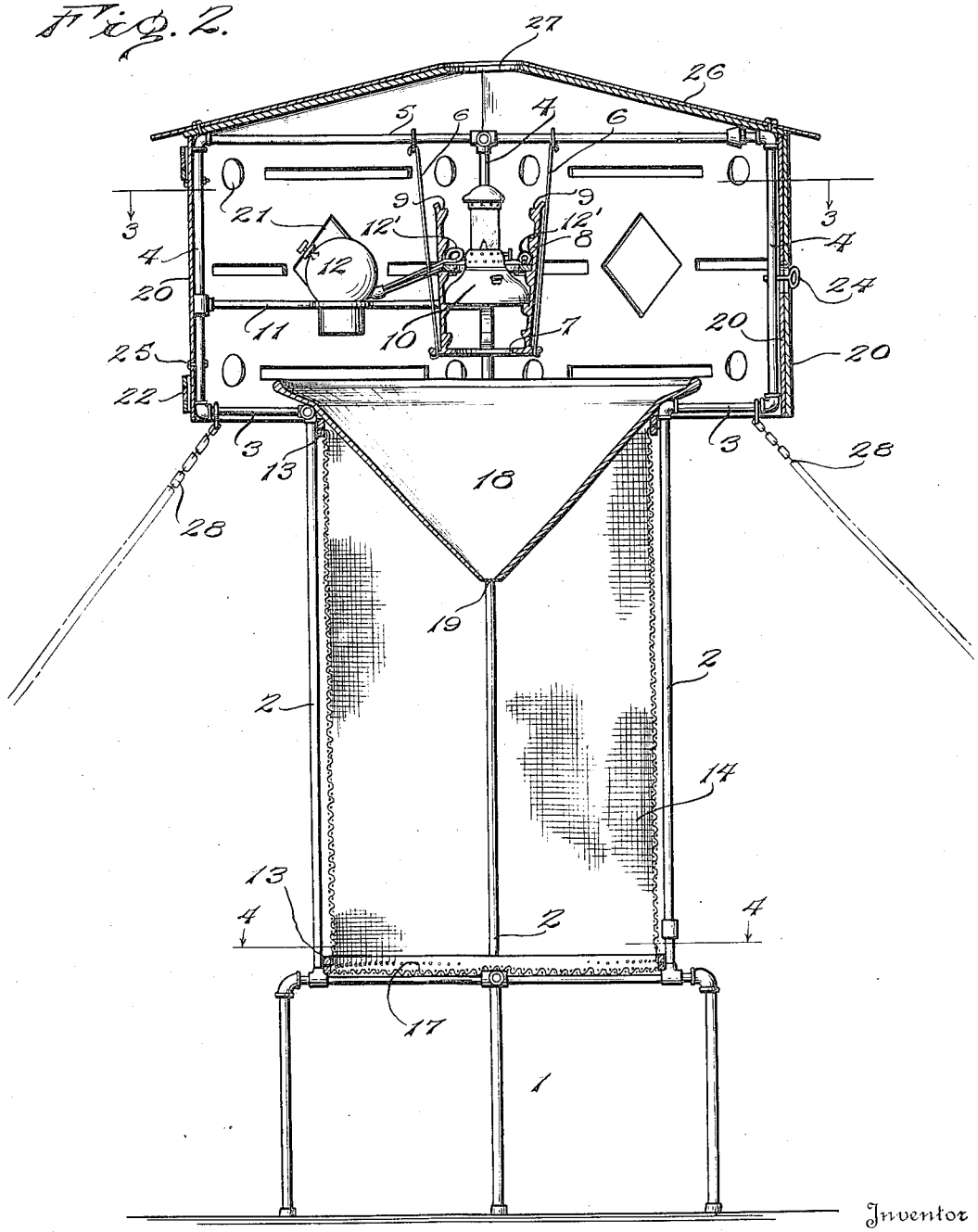

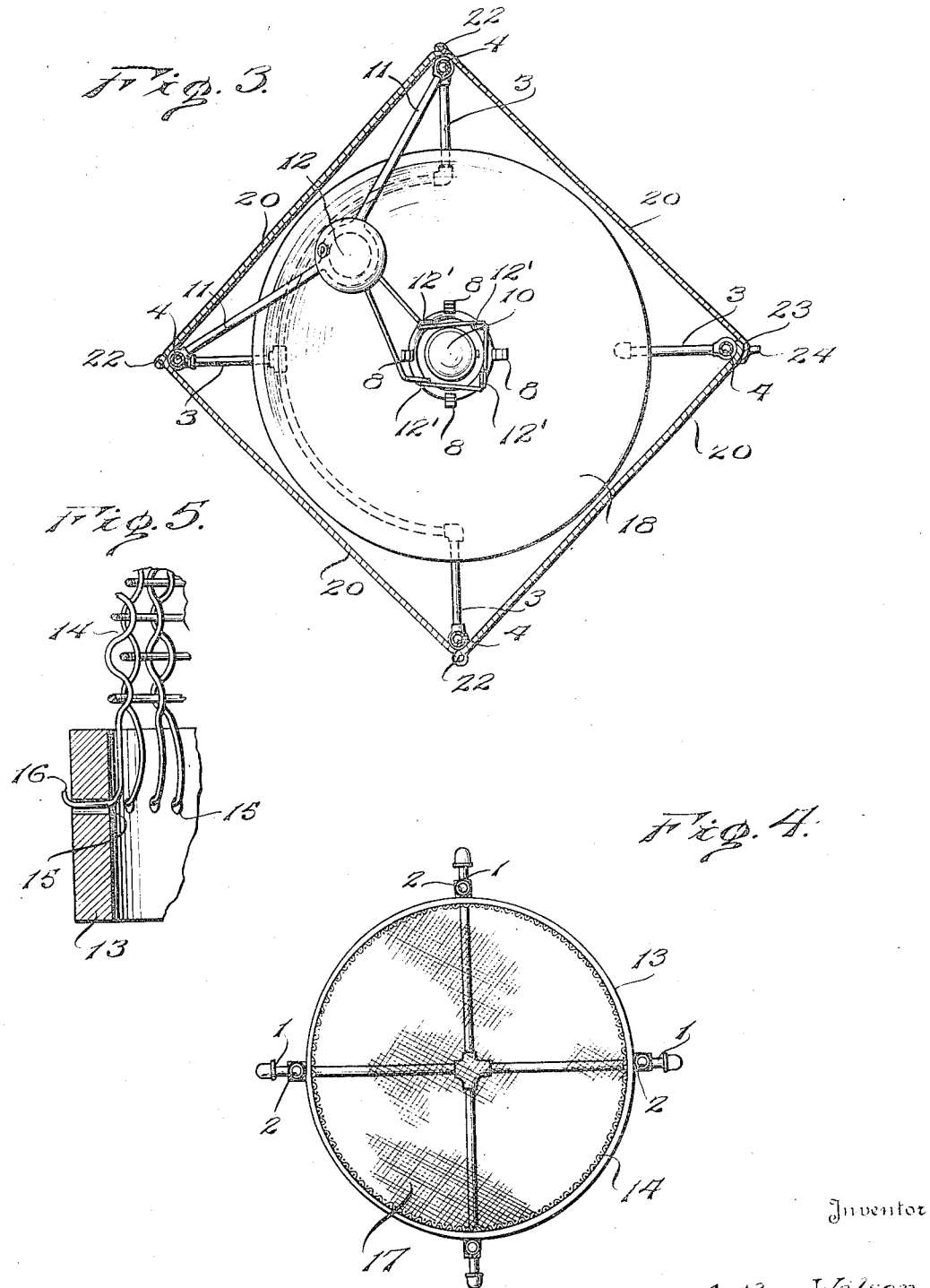

1,482,420

UNITED STATES PATENT OFFICE.

ARTHUR WILSON, OF GLENDORA, MISSISSIPPI.

BOLL-WEEVIL TRAP.

Application filed October 31, 1922. Serial No. 598,164.

*To all whom it may concern:*

Be it known that I, ARTHUR WILSON, a citizen of the United States, residing at Glendora, in the county of Tallahatchie and State of Mississippi, have invented certain new and useful Improvements in Boll-Weevil Traps, of which the following is a specification.

My invention relates to means for destroying boll weevils and similar insects and has for its object the provision of an inexpensive apparatus which may be readily set up in a field and by the use of which the insects will be attracted and drawn into a trap from which they cannot escape. Extended observation has demonstrated to me that boll weevils are attracted by a strong glaring light and that they will leave the plants upon which they may be feeding and will fly to and about the light so that they are easily trapped if proper trapping arrangements be provided. I have also found that boll weevils and moths are provided with wings which become useless if signed, and I utilize the results of my observations in the provision of a trap whereby the boll weevils will be caught and retained. My invention, therefore, broadly stated, consists in providing a structure which may be set up in a field at a low cost and in which will be housed a lamp or lantern, the light of which will issue through openings provided therefor in the sides of the apparatus, which openings will permit the entrance of the insects to the light. Associated with the light is a singeing device below which is provided a trap or cage into which the insects may drop but from which they cannot escape, all of which is illustrated in the accompanying drawings and will be hereinafter fully set forth.

In the drawings—

Figure 1 is a perspective view of an apparatus embodying my present invention;

Fig. 2 is a vertical section of the same;

Fig. 3 is a horizontal section on the line 3—3 of Fig. 2.

Fig. 4 is a horizontal section on the line 4—4 of Fig. 2, and

Fig. 5 is an enlarged detail section of a portion of the trap or cage.

In carrying out my invention, I employ a main supporting frame which may be of any suitable material and is illustrated in the accompanying drawings as composed of metal tubing. This frame comprises a base portion 1 which is adapted to rest upon the ground and may be of any approved pattern. Rising from the supporting base are standards 2 which may be provided in any desired number, four being shown in the present instance. The upper ends of these standards support outwardly projecting arms 3, from the outer ends of which rise posts 4 which are preferably disposed in rectangular relation, as shown most clearly in Fig. 3, and two of these posts are connected by a cross beam 5, from which depend hangers 6 connected at their lower ends by a base plate 7. Rising from the said base plate are brackets 8 which are preferably somewhat resilient and are provided upon their inner opposed faces with a plurality of shoulders 9 upon which the lantern 10 may be placed. The lantern may be of any preferred form and by being engaged upon proper shoulders 9 may be set at such elevation as experience may suggest. Below the beam 5, to the posts 4 I secure a side beam or bracing support 11 upon which is carried a generator reservoir 12 to supply singeing burners 12' with fuel. The burners 12' may be of any desired form and preferably will be designed for gas or vapor arising from or generated from hydrocarbons, carbide, alcohol, or other fuel base. It is not intended, however, that the apparatus be restricted to the use of a gas burner as other forms of burners may be used and satisfactory results may be attained by the use of an ordinary oil burner in which event the element 12 will be merely a tank or reservoir to contain a fuel supply.

To the upper and lower ends of the standards 2, I secure annular bands or hoops 13 and to the said bands or hoops I secure the vertical cylindrical wall of a cage 14 which is preferably constructed of wire netting. The ends of this cylindrical wall are secured to the hoops 13 in any convenient manner, and in Fig. 5 I have shown the longitudinal strands of the netting as inserted through transverse openings 15 in the hoop and then bent against the outer surface of the hoop, as indicated at 16. The cylindrical netting is thus maintained in a proper taut condition so as to extend the full distance between the hoops and prevent escape of the insects which may have been led into the cylinder. The upper hoop 13 is left unobstructed, except for a bowl which will be presently mentioned, but the lower hoop has secured thereto a bottom 17 which may be imperforate, if preferred, but is illustrated as composed of wire netting inasmuch as such a structure is inexpensive and adds to the effectiveness of the device, moths or other insects outside of the cage being attracted to the apparatus by the presence of other moths inside the cage.

Disposed below and concentric with the lamp 10, which is preferably arranged at the center or on the vertical axis of the apparatus, is a bowl or inverted conical cap 18 which rests upon the upper ends of the posts or standards 2 and has its apex within the cylindrical trap 14. The inverted apex of this bowl is open, as shown at 19, whereby the insects may readily pass through the bowl into the trap, and the upper end of the cap or bowl is of such diameter that the sides of the bowl will rest upon the upper ends of the standards 2 and fill the open upper end of the trap or cage.

Enclosing the posts 4 is a hood consisting of side plates 20 which may be of any opaque material and have openings 21 of various outline formed therethrough. These side plates 20 may be of sheet metal hinged together at their ends, as indicated at 22, whereby they may be readily fitted about the frame presented by the posts 4, and the free ends of the meeting side plates are formed to overlap, as shown at 23, and are equipped at the overlapping ends with any convenient form of key or locking device 24. The side plates may be secured to the posts 4 in any convenient manner, as by clips indicated at 25. I also provide a roof or cap 26 which is of such dimensions as to extend over the entire upper end of the frame and the side plates 20 and thereby protect the lamp from the elements, this cap or roof being of a shallow conical form so that it will deflect rain beyond the sides of the apparatus and it is provided centrally with an opening 27 to permit escape of the products of combustion and excessive heated air, which opening may be screened, if desired, to prevent escape of the weevils and other insects.

The device constructed and arranged as shown and described is set up in a field and it should be of a considerable height so that it may be seen for a considerable distance at night when the lamp is lighted. The light from the lamp or lantern will issue through the openings in the side plates and will, consequently, define brilliant areas which will attract the weevils, moths and other pests. The insects attracted by the light will pass through the openings in the side plates and after entering the hood or enclosure follow their usual custom of circling about the lamp. Eventually they will come within the range of the heat rising from the singeing burners so that their wings will be singed, whereupon they will drop into the bowl 18 and pass through the same into the cage. Inasmuch as their wings are now useless, they cannot escape from the cage but will be restrained therein until they may be destroyed in any manner which may be preferred. It is to be understood that the lamp 10 may be of any type and burn any fuel which will produce a strong white light while the singeing burners are to give out heat rather than brilliance to destroy the guaze-like wings of the insects flying thereover.

My device is obviously simple and inexpensive and may be set up at any place. The base is preferably of such form that the legs or ground-engaging members thereof will be spaced apart an appreciable distance and will thereby furnish a stable support for the apparatus, but in order to guard against toppling of the apparatus under the force of high winds and storms, guys 28 which may be chains, as shown, are attached to the lateral arms 3 of the main frame and extend outwardly and downwardly therefrom to suitable anchors, indicated at 29.

Having thus described the invention, what is claimed as new is:

1. An apparatus for the purpose set forth comprising a supporting frame, a cage carried by said frame, a hood secured upon said frame and enclosing the upper end of the cage, a light-emitting element supported within the hood, and a bowl extending across and resting on the upper end of the cage below the light-emitting element and having an opening in its bottom constituting an entrance to the cage.

2. An apparatus for the purpose set forth comprising a supporting frame including standards, annular bands secured to the upper and lower ends of the said standards, a foraminous cylindrical wall extending between said annular bands, and having its end elements extending through the respective annular bands and clenched against the outer sides thereof, a closure for the lower band, a bowl supported by the standards and extending across the upper annular band and having an opening in its bottom, and a light-containing hood supported by the frame above and around the said bowl.

3. An apparatus for the purpose set forth comprising a supporting frame, a cage mounted upon the frame, a hood secured upon the frame above and around the upper end of the cage and consisting of opaque side members having openings formed therethrough, a hanger suspended from the upper end of the frame within the hood and above the cage, and a lamp carried by said hanger and adjustable vertically thereon.

4. An apparatus for the purpose set forth comprising a supporting frame, a cage mounted in said frame, a hood consisting of hingedly connected side plates of opaque material fitting around the upper end portion of the frame, means for securing said side plates to the frame and locking the free ends thereof to the frame, a roof extending over the frame and said side plates, a bowl supported by the frame and passing through the upper end of the cage, and a lamp supported by the frame within the hood and over the said bowl.

5. An apparatus for the purpose set forth comprising a supporting frame, a hood around the upper portion of the frame, an insect-attracting element suspended from the frame within the hood, a singeing device associated with said element, and a trap supported by the frame below the hood.

6. An apparatus for the purpose set forth comprising a supporting frame, a hood around the upper portion of the frame, an insect-attracting element carried by the frame within the hood, and a singeing device associated with said element.

7. An apparatus for the purpose set forth comprising a supporting frame, a hood around the upper portion of the frame, an insect-attracting element carried by the frame within the hood, a singeing device associated with said element, a trap supported below the hood, and a bowl supported by and extending across the upper end of the trap and having an opening in its bottom to direct singed insects into the trap.

In testimony whereof I affix my signature.

ARTHUR WILSON. [L. S.]